United States Patent
Yano

(10) Patent No.: US 6,297,567 B1
(45) Date of Patent: Oct. 2, 2001

(54) ENGINE CONTROL SYSTEM AND VEHICULAR ANTI-THEFT SYSTEM

(75) Inventor: Masato Yano, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/348,255

(22) Filed: Jul. 7, 1999

(30) Foreign Application Priority Data

Jul. 14, 1998 (JP) .................................................. 10-198796

(51) Int. Cl.[7] ........................................................ G06F 7/04
(52) U.S. Cl. ..................... 307/10.3; 180/287; 340/825.72; 380/49; 477/99
(58) Field of Search ................................. 307/10.2, 10.1, 307/10.3, 10.4; 380/49; 340/825.69, 825.72, 825.71; 477/99; 123/179.3; 180/287

(56) References Cited

U.S. PATENT DOCUMENTS

| | | | |
|---|---|---|---|
| 5,708,712 | * | 1/1998 | Brinkmeyer et al. .................... 380/49 |
| 5,736,935 | * | 4/1998 | Lambropoulos ................ 340/825.72 |
| 5,796,179 | | 8/1998 | Honaga . |
| 5,838,075 | * | 11/1998 | Yamasaki ............................ 307/10.3 |
| 5,937,065 | * | 8/1999 | Simon et al. ............................. 380/9 |

* cited by examiner

Primary Examiner—Albert W. Paladini
(74) Attorney, Agent, or Firm—Nixon & Vanderhye P.C.

(57) ABSTRACT

A vehicular anti-theft device having a high security performance against the theft of the vehicle without adding additional components is disclosed. The vehicular anti-theft device mainly includes a code collator and an engine ECU connected to the code collator so as to communicate each other. The code collator detects whether a password code of an ignition key inserted into the ignition key cylinder accords with a password code of a vehicle. The engine ECU detects whether an engine should be started up or not by communicating with the code collator when an ignition key is detected to be turned on. Here, the engine ECU generates a digital data by A/D converting analog signals to be used for engine controlling, generates a transmission data by serially combining lower 2-bits of each A/D converted data, and then sends the transmission data to the code collator. Therefore, the communication data between the engine ECU and the code collator can be changed at random without adding additional components.

82 Claims, 6 Drawing Sheets

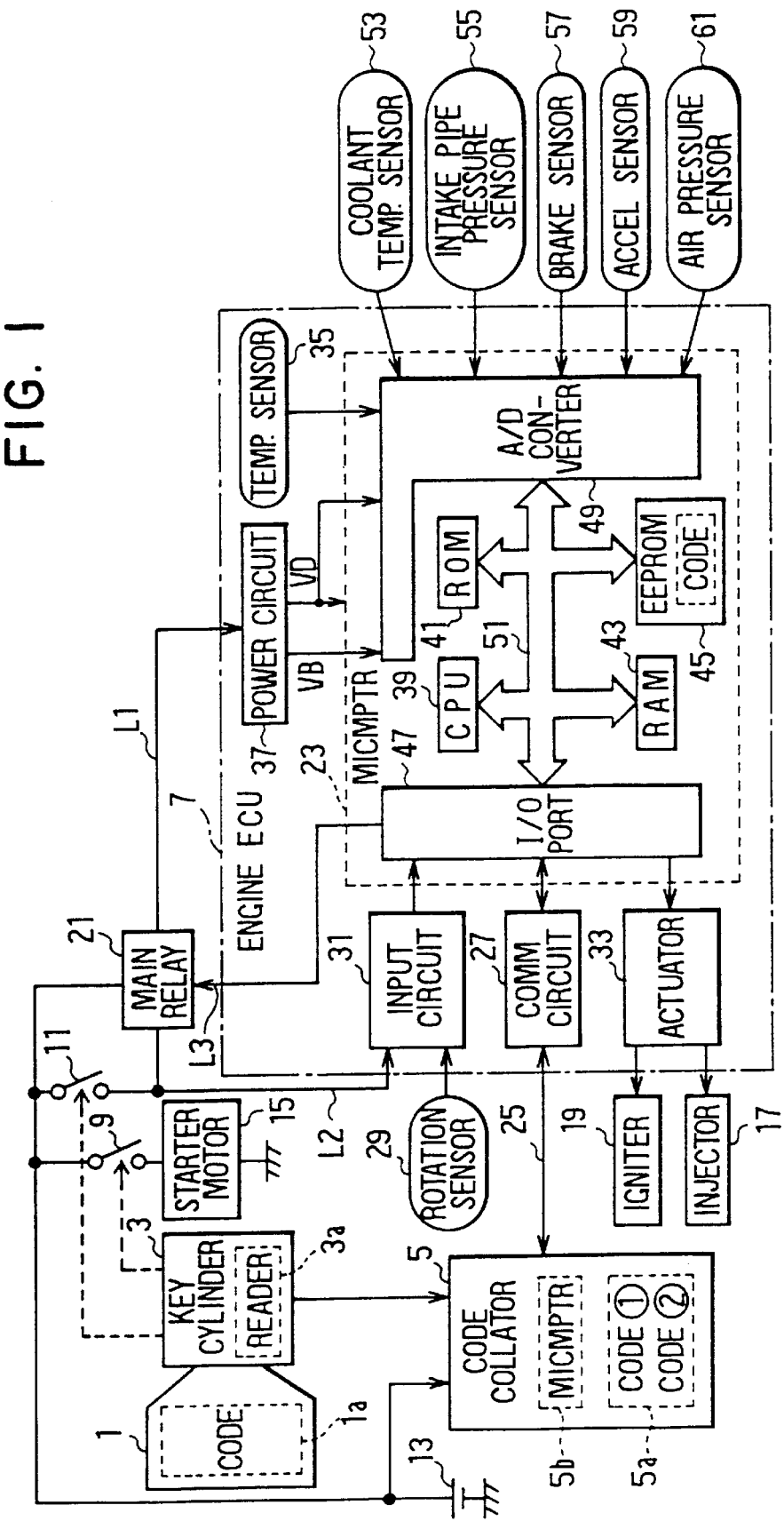

FIG. 3

RANDOM NUMBER (RN) =
+ (LOWER 2 bit OF A/D VALUE OF COOLANT TEMP. SENSOR)
+ (LOWER 2 bit OF A/D VALUE OF TEMP. SENSOR IN ECU)
+ (LOWER 2 bit OF A/D VALUE OF BATTERY VOLTAGE)
+ (LOWER 2 bit OF A/D VALUE OF INTAKE PIPE PRESSURE SENSOR)
+ (LOWER 2 bit OF A/D VALUE OF BRAKE SENSOR)
+ (LOWER 2 bit OF A/D VALUE OF ACCEL SENSOR)
+ (LOWER 2 bit OF A/D VALUE OF AIR PRESSURE SENSOR)
+ (LOWER 2 bit OF A/D VALUE OF ECU POWER SUPPLY VOLTAGE)

⇒ RANDOM NUMBER (16 bit)

| bit 15,14 | bit 13,12 | bit 11,10 | bit 9,8 | bit 7,6 | bit 5,4 | bit 3,2 | bit 1,0 |
|---|---|---|---|---|---|---|---|
| ECU VOLTAGE | AIR PRESSURE | ACCEL | BRAKE | INTAKE PIPE PRESSURE | BATTERY VOLTAGE | ECU TEMP. | COOLANT TEMP. |

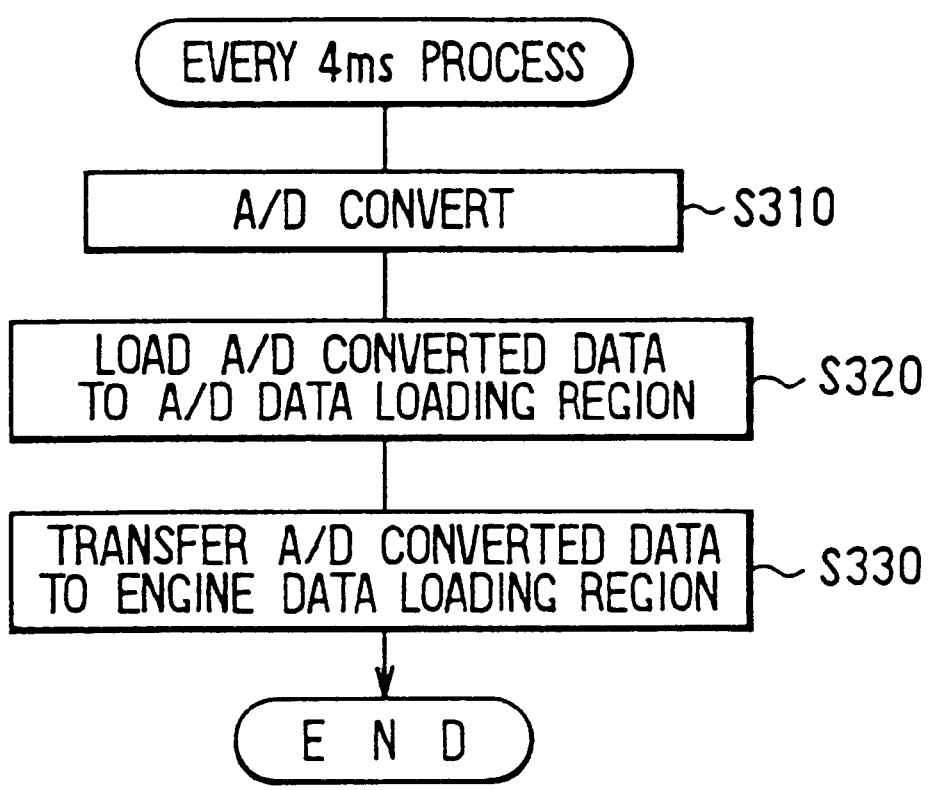

ENGINE CONTROL SYSTEM AND VEHICULAR ANTI-THEFT SYSTEM

CROSS REFERENCE TO RELATED APPLICATION

This application is based upon Japanese Patent Application No. Hei. 10-198796 filed on Jul. 14, 1998, the contents of which are incorporated herein by reference.

BACKGROUND OF THE INVENTION

1. Field of the Invention

This invention generally relates to vehicular anti-theft system and device, and especially to vehicular anti-theft system and device, which can control start-up of an engine of a vehicle such as an automobile, and to engine control system and device having an anti-theft device.

2. Related Art

In the anti-theft device, various countermeasures have been developed to prevent vehicles from being stolen by manipulating an ignition key cylinder either with or without the use of a regular (valid) ignition key.

In this kind of anti-theft device, an electronic ignition key (hereinafter, called "ignition key"), which is unique to each vehicle, generally has a unique password code therein. An immobilizer device provided in the vehicle reads the password stored in the ignition key, and detects whether a start-up of an engine is due to a regular operation or not by collating the read password and a vehicular password code stored in the immobilizer device.

An engine control device, which controls the engine of the vehicle, detects whether the start-up of the engine is due to a regular operation (valid operation) or not by communicating with the immobilizer via a communication line. When the start-up of the engine is not detected to the regular operation, the immobilizer stops the engine.

Next, a communication procedure between the engine control device and the immobilizer will be explained.

(1) At first, when the engine control device starts up its operation by being supplied with a power from a battery, the engine control device sends a request signal for requesting a collation result of the password codes to the immobilizer.

(2) When the immobilizer receives the request signal sent from the engine control device in the procedure (1), the immobilizer sends a collation result signal, which indicates whether the password code in the ignition key accords with the password code in the vehicle, to the engine control device.

(3) After that, the engine control device receives the collation result signal sent from the immobilizer in the procedure (2). When the collation result signal is one that indicates an accord of the passwords, the immobilizer generates a random number by a predetermined method. Furthermore, the engine control device generates a transmission data by, for example, encoding the generated random number and then sends the transmission data to the immobilizer.

(4) When the immobilizer receives the transmission data sent from the engine control device in the procedure (3), the immobilizer processes the received transmission data with a predetermined process and then sends the processed transmission data to the engine control device as a response data.

(5) After that, the engine control device receives the response data sent from the immobilizer in the procedure (4), and extracts the random number from the response data by using a decoding process relative to the predetermined process in the procedure (4). The engine control device detects whether the extracted random number accords with the random number sent to the immobilizer in the procedure (3). When the random numbers accord each other, the engine control device detects that the start-up of the engine is due to the regular operation but not due to an unjust conduct, and then starts regular engine control. On the contrary, when the random numbers do not accord each other, or when the engine control device does not receive the response data from the immobilizer within a predetermined time although the engine control device has sent the transmission data in the procedure (3), the engine control device detects that the start-up of the engine is due to the unjust conduct, and then stops the engine.

Here, reasons to process the communication procedures (3)–(5) will be explained.

When the engine control device detects the operation of the start-up of the engine based on only the collation result signal sent from the immobilizer in the procedure (2), a person who intends to steal the vehicle may be able to start up the engine by, for example, the following manipulation. That is, the collation result signal being sent in a regular operation (the collation result signal indicating the accord between the password code of the ignition key and the password code of the vehicle) from the immobilizer to the engine control device is previously investigated by using this vehicle or another vehicle. In this case, when the investigated collation result signal is input to the communication line of the engine control device of this vehicle, the engine control device may start up the engine of this vehicle.

Therefore, by processing the procedures (3)–(5), the engine control device can confirm that the immobilizer correctly operates with no unjust conduct.

Especially, reasons, of which the engine control device generates the random number and further generates the transmission data to the immobilizer based on the random number, are that the engine control device changes the communication data being communicated between the engine control device and the immobilizer at random at every communication.

That is, if the communication data being communicated between the engine control device and the immobilizer are always the same, a person who intends to steal the vehicle may start up the engine by, for example, the following manipulation. That is, the communication data being communicated between the engine control device and the immobilizer is previously investigated by using this vehicle or another vehicle. In this case, when the investigated communication data is input to the communication line of the engine control device of this vehicle, the engine control device may start up the engine of this vehicle.

Therefore, by generating the random data and the transmission data to the immobilizer from the random data (furthermore, a detection data being communicated between the engine control device and the immobilizer to detect whether the start-up of the engine is due to the regular operation or not), the communication data being communicated between the engine control device and the immobilizer is changed at every communication. Therefore, a security performance against a theft of the vehicle can largely improve.

Here, such an engine control device constituting a vehicular anti-theft device generates the random number based on a counter value of a free running counter always operating in a microcomputer, or a time value of a clock separately built in itself. For example, there have been proposed an engine control devices in which a counter value of the free running counter is read at the time just before the engine control device sends the transmission data to the immobilizer so that the read counter value is used as the random number, and in which a time of the clock is read at the time just before the engine control device sends the transmission data to the immobilizer so that a data indicating the read time is used as the random number.

However, the above-described engine control device needs to detect whether it should start up the engine or not before starting the engine control after a power is supplied thereto from a battery. Therefore, in general, the engine control device generates the random number at a specific period (for example, a timing around 100 ms) which is just after starting the operation from an initial condition (reset condition) after a power is supplied thereto from the battery.

Therefore, in the case that the random number is generated based on the counter value of the free running counter, the count value of the free running counter is concentrated to the specific period. At a result, the random number to be generated is also concentrated to a specific range of value. Therefore, the transmission data which is sent from the engine control device to the immobilizer device, and the response data which is sent from the immobilizer to the engine control device in response to the transmission data are not changed at every communication. Hence, it may be difficult to have high security performance against the theft of the vehicle.

On the contrary, in the case the random number is generated based on the time of the clock, it may useful to generate the random number (furthermore, the communication data between the engine control device and the immobilizer) completely at random. However, because such the engine control device needs to have additional clock, which is not needed the other purpose, in the engine control device, a total mounting area and a total cost may increase. Furthermore, because it needs to supply a power from the battery to the engine control device all the time, a power consumption of the battery may increase.

SUMMARY OF THE INVENTION

This invention has been conceived in view of the background thus far described and its first object is to provide a vehicular anti-theft device having a high security performance against the theft of the vehicle.

A second object is to provide an engine control device suitable for constructing the vehicular anti-theft device.

According to the present invention, detecting means, which detects whether a start-up of the engine is due to a regular operation or not, sends a transmission data to an external device. When the detecting means detects that a start-up of the engine is not as the regular operation, if the detecting means does not receive a response data corresponding to the transmission data from the external device, the detecting means stops operation of the engine. Here, data changing means changes the transmission data based on the digital data converted by the A/D converting means.

Since the analog signal to be used for controlling the engine generally varies, the digital data by converting the analog data to digital data also varies. By changing the transmission data based on such variable digital data, the transmission data can be efficiently changed. Therefore, according to the engine control system of the present invention, the transmission data between the other device can be changed at random at every communication without adding substantial components needless for an engine control such as an additional clock. Hence, a security performance against a theft of the vehicle can largely improve without adding substantial components.

BRIEF DESCRIPTION OF THE DRAWINGS

These and another objects, features and characteristics of the present invention will be appreciated from a study of the following detailed description, the appended claims, and drawings, all of which form a part of this application. In the drawings:

FIG. 1 is a schematic diagram illustrating a construction of a vehicular anti-theft device of the present invention;

FIG. 3 is a diagram illustrating a method of generating a random number;

FIG. 4 is a flow chart of an every 4 ms process executed by the microcomputer of the engine ECU at every 4 ms;

DESCRIPTION OF THE PREFERRED EMBODIMENTS

Figure 2A:
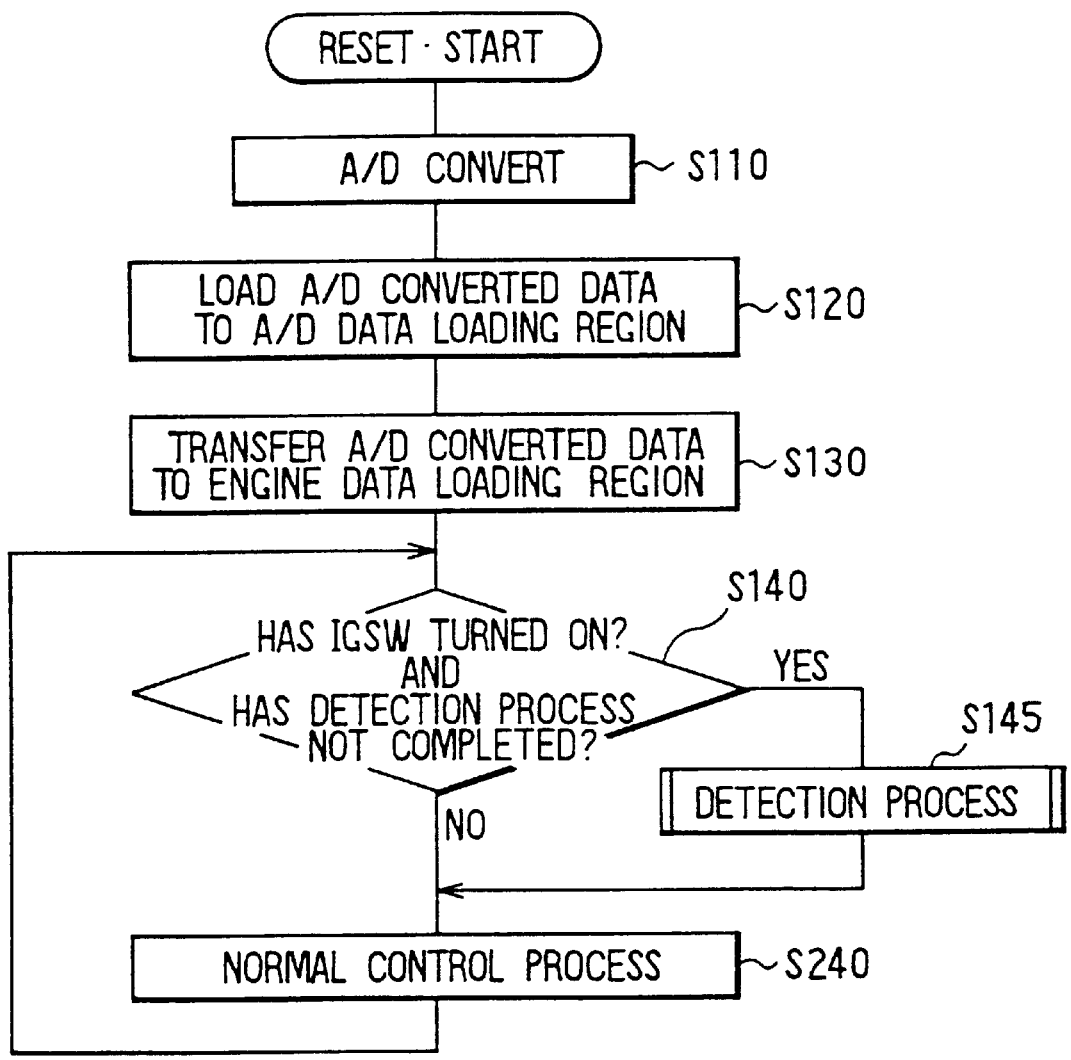
FIG. 2A is a flow chart of a main process executed by a microcomputer of an engine ECU from just after release a reset.

A preferred embodiment of the present invention will be explained with reference to the accompanying drawings.

FIG. 1 is a block diagram illustrating a basic structure of a vehicular anti-theft device for preventing a vehicle having an internal combustion engine such as an automobile from being stolen.

As shown in FIG. 1, the vehicular anti-theft device of this embodiment includes: an ignition key cylinder 3 in which an ignition key 1 having a key pattern unique to the vehicle is inserted; a code collator 5 for detecting whether a start-up of an engine is due to a regular operation or not by detecting whether an electronic ignition key (hereinafter, called "ignition key") inserted into the ignition key cylinder is regular ignition key 1 or not; and an engine control device {hereinafter, called "engine ECU (Electronic Control Unit)"} 7 for controlling the engine.

On the contrary, this vehicle includes a starter switch 9, which turns on by rotating operation of the ignition key 1 inserted in the ignition key cylinder 3, and an ignition switch 11.

When the starter switch 9 turns on, a starter motor 15 is driven by being supplied with a power from a battery 13 so that the engine is cranked up to start up.

Furthermore, by turning on of the ignition switch 11, the power from the battery 13 is supplied to the engine ECU 7, a fuel injector 17 for injecting fuel to each cylinder of the engine, and an igniter 19 for igniting air-fuel mixture in each cylinder of the engine.

Here, the power from the battery 13 is supplied to the engine ECU 7 by a main relay 21 as a power supplying relay via a power line L1.

That is, the main relay 21 is constructed so as to connect a plus terminal of the battery 13 to the power line L1 by short-circuiting (turning on) its own contacts when an operation signal is applied thereto externally. Therefore, when the ignition switch is turned on, the contacts of the main relay 21 are shorted, the power from the battery 13 is supplied to the engine ECU 7 via the power line L1, and then the engine ECU 7 starts up operation. When the engine ECU 7 starts up the operation, it detects ON/OFF condition of the ignition switch 11 by detecting a voltage level of a switching condition detecting signal line L2. Even when the engine ECU 7 detects turning off of the ignition switch 11, the engine ECU 7 keeps to output the operation signal to the main relay 21 via the signal line L3 so as to keep the contacts of the main relay 21 being shorted until the engine ECU 7 detects an affirmation of a predetermined power-off conditions. Therefore, when the ignition switch 11 is turned off, the contacts of the main relay 21 are kept shorted. When the ignition switch 11 is turned off and the predetermined power-off conditions are affirmed, the power supplied to the engine ECU 7 are cut off.

Here, the ignition key 1 has a memory 1a for previously memorizing a password code relative to the key pattern.

The ignition key cylinder 3 has a reader 3a. The reader 3a reads the password code memorized in the memory 1a of the ignition key 1 inserted into the ignition key cylinder 3, and sends the read password code to the code collator 5 when the ignition switch 11 turns on, that is, the ignition switch 11 is changed from off to on.

The code collator 5 includes a memory 5a for memorizing two different password codes ①, ②, and a microcomputer 5b. The code collator 5 receives the password code in the ignition key 1 read by the reader 3a of the ignition key cylinder 3, and detects whether the ignition key inserted into the ignition key cylinder 3 is a regular ignition key 1 or not by collating the received password and the password code ① in the memory 5a by using a process operation of the microcomputer 5b.

Next, a construction of the engine ECU 7 will be explained.

As shown in FIG. 1, the engine ECU 7 includes: a microcomputer 23 that governs an operation of this ECU 7; a communication circuit 27 that performs a data communication with the code collator 5 via a communication line 25; an input circuit 31 that shapes waveforms of signal from a rotation sensor 29 for outputting a pulse signal proportional to a rotation of the engine and signals from the signal line L2 such as ON/OFF signal of the ignition switch 11, and output the waveform-shaped signals to the microcomputer 23; an actuator 33 that actuates the fuel injector 17 and the igniter 19 based on a control signal from the microcomputer 23; a temperature sensor 35 that outputs an analog signal proportional to temperature of the engine ECU 7; and a power circuit 37 that receives a power from the battery 13 via the power line L1, and that supply with an operating power voltage $V_D$ (e.g., 5 V) to the microcomputer 23 and supply with an operating battery voltage $V_B$ (e.g., a voltage of the plus terminal of the battery 13 with respect to ground level) to the communication circuit 27 and the actuator 33.

Here, the power circuit 37 has a so-called power on reset function that the power circuit 37 outputs a reset signal to the microcomputer 23 during a predetermined period in which the power voltage is thought to be stabled after a start of supplying the power voltage $V_D$.

Furthermore, the microcomputer 23 includes: a CPU 39 that executes programs; a ROM 41 that memorizes the programs to be executed by the CPU 39; a RAM 43 that temporary memorizes calculation results of the CPU 39 or the like; an EEPROM 45 that can electrically erase and write data memorized therein; an I/O port 47 that communicates signals between the communication circuit 27, the input circuit 31, and the actuator 33; an A/D converter 49 that converts analog signals to digital signals; and a bus 51 that connects each of the above portions.

Here, a password code unique to the engine ECU 7, which is to be collated with the password code ② having been sent from the code collator 5, as described later, and been memorized in the memory 5a, is previously memorized in the EEPROM 45.

The main relay 21 inputs an operation signal from the I/O port 47 via the signal line L3.

Furthermore, at the external of the engine ECU 7, there are provided: a coolant temperature sensor 53 that outputs an analog signal proportional to temperature of coolant of the engine; an intake pipe pressure sensor 55 that outputs an analog signal proportional to a pressure of an intake pipe of the engine; a brake sensor 57 that outputs an analog signal proportional to depressing amount of a brake pedal; an accelerator sensor 59 that outputs an analog signal proportional to depressing amount of an accelerator pedal; and an air pressure sensor 61 that outputs an analog signal proportional to air pressure.

The A/D converter 49 inputs analog signals including: output signals from the temperature sensor 35, the coolant temperature sensor 53, the intake pipe pressure sensor 55, the brake sensor 57, the accelerator sensor 59 and the air pressure sensor 61; the power voltage $V_D$; and the battery voltage $V_B$; as the analog signals used for controlling the engine. Here, in this embodiment, the resolution of the analog-digital conversion of the A/D converter 49 is 10-bits. The A/D converter 49 converts each of the analog signals being input therein to 10-bits digital signals in reply to a command signal from the ECU 39.

According to the engine ECU 7 constructed the above, when the ignition switch 11 is turned on, the power from the battery 13 is supplied to the power circuit 37 via the main relay 21 and the power line L1. As a result, the power voltage $V_D$ is supplied to the microcomputer 23 from the power circuit 37, and the battery voltage $V_B$ is supplied to the communication circuit 27 and the actuator 33.

When the reset due to the power on reset function of the power circuit 37 is released while the power voltage $V_D$ is supplied to the microcomputer 23, the microcomputer 23 (in detail, the CPU 39) executes the programs stored in the ROM 41 and detects whether the start-up of the engine is due to the regular operation or not (in detail, whether the ignition switch is turned on due to the regular ignition key 1 is inserted into the ignition key cylinder 3 and being operated by rotating) by performing the data communication between the code collator 5.

When the microcomputer 23 detects that the start-up of the engine is due to the regular operation, the microcomputer 23 permits the fuel injection and the ignition against the engine to control the engine. In detail, the microcomputer 23 calculates a fuel injection amount or an ignition timing based on one of a pulse signal from the rotation sensor 29 and the digital data converted by A/D converter 49, and actuates the fuel injector 17 and the igniter 19 based on the calculated value to adequately perform a control of the engine suitable for an operation condition of the engine.

On the contrary, when the microcomputer 23 detects that the start-up of the engine is not due to the regular operation, the microcomputer 23 prohibits the fuel injection and the ignition against the engine so that the engine does not operate to prevent the vehicle from being stolen.

Next, a process executed by the microcomputer 23 (in detail, the CPU 39) of the engine 7 and a process executed by the microcomputer 5b of the code collator 5 to prevent the vehicle from being stolen will be explained with reference to FIGS. 2–5.

FIG. 2 shows a flow chart of the main process, which is executed from just after the release of the reset in the microcomputer 23 of the engine ECU 7. Here, the main process is executed not only when the regular operation in which the ignition switch 11 is turned on by the regular ignition key but also when the unjust conduct in which the power form the battery 13 is directly connected to the power line L1 and the starter motor 15.

As shown in FIG. 2, the microcomputer 23 of the engine ECU 7 starts the main process after the release of the reset.

At step S110, the A/D converter 49 converts each of the six analog signals and two voltages to eight 10-bits digital signals, respectively. Here, the six analog signals include the outputs from the temperature sensor 35, the coolant temperature sensor 53, the intake pipe pressure sensor 55, the brake sensor 57, the accelerator sensor 59 and the air pressure sensor 61. The two voltages include the power voltage $V_D$ and the battery voltage $V_B$ from the power circuit 37.

At step S120, each of the digital data converted from the analog to digital (hereinafter, called "A/D converted data") is loaded to a (not-shown) A/D converted data loading region provided in the RAM 43.

At step S130, a process to adjust the LSB (Least Significant Bit) such as round-down or round-up the LSB is conducted on the A/D converted data stored in the A/D converted data loading region. After that, each of the LSB-adjusted A/D converted data is stored in a (not shown) engine controlling data loading region.

Here, the A/D converted data stored in the engine controlling data loading region is used for controlling the engine at normal control process S240 described after. The reason to adjust the LSB of the A/D converted data at step S130 is that the A/D converted data includes the more quantize error (A/D conversion error) as the lower bit of the A/D converted data.

At step S140, the microcomputer 23 detects whether the ignition switch (IGSW) 11 is turned on and a detection process S145 consists of steps S150-S230 has not completed. That is, the microcomputer 23 detects that the detection process S145 has not executed yet after the ignition switch 11 is detected to be turned on. Here, the ON/OFF condition of the ignition switch 11 is detected based on a voltage level of the signal line L2 with respect to the ground level. Not shown in FIG. 2, memorized data such as a flag that indicates the completion of the detection process is erased when the ignition switch 11 is turned off or the microcomputer 23 is reset.

When the microcomputer 23 detects that the detection process S145 has not completed (at step S140; YES), the detection process shown in FIG. 2B is executed.

Figure 2B:
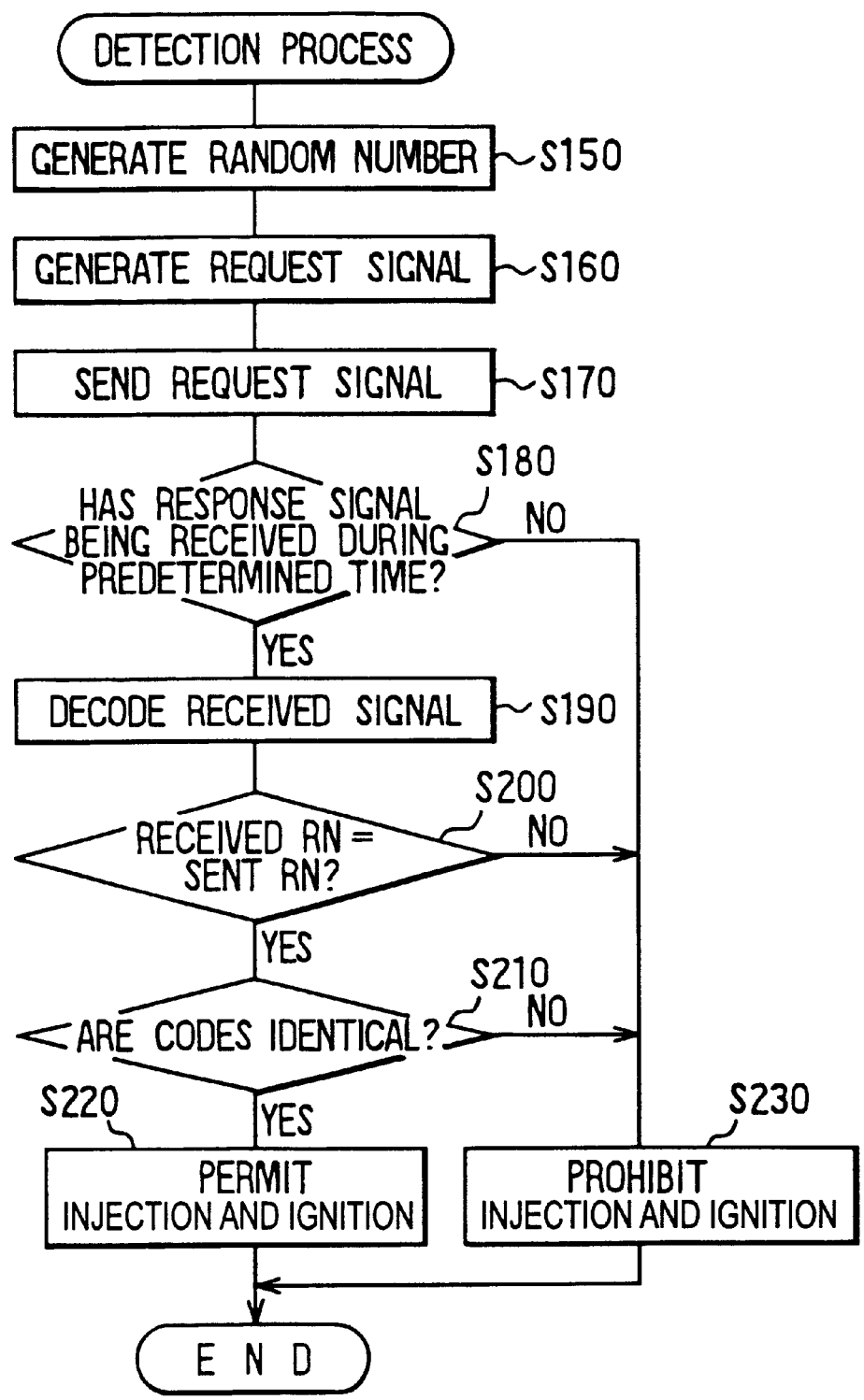
FIG. 2B is a flow chart of a detection process in the main process.

In the detection process shown in FIG. 2B, at step S150, the microcomputer 23 reads the eight A/D converted data stored in the A/D converted data loading region of the RAM 43, and generates 16-bits random number by serially combining lower 2-bits (2-bits from the lowermost bit) of each A/D converted data.

For example, in this embodiment, as shown in FIG. 3, the lower 2-bits of the A/D converted data of the analog signal from the coolant temperature sensor 53 is assigned to 0, 1 bits from the LSB of the random number. Similarly, the lower 2-bits of the A/D converted data of the analog signal from the temperature sensor 35 in ECU is assigned to 2, 3 bits from the LSB of the random number. The lower 2-bits of the A/D converted data of the battery voltage $V_B$ is assigned to 4, 5 bits from the LSB of the random number. The lower 2-bits of the A/D converted data of the analog signal from the intake pipe pressure sensor 55 is assigned to 6, 7 bits from the LSB of the random number. The lower 2-bits of the A/D converted data of the analog signal from the brake sensor 57 is assigned to 8, 9 bits from the LSB of the random number. The lower 2-bits of the A/D converted data of the analog signal from the accelerator sensor 59 is assigned to 10, 11 bits from the LSB of the random number. The lower 2-bits of the A/D converted data of the analog signal from the air pressure sensor 61 is assigned to 12, 13 bits from the LSB of the random number. The lower 2-bits of the A/D converted data of the power voltage $V_D$ is assigned to 14, 15 bits from the LSB of the random number.

At step S160, the 16-bits random number generated at the step S150 is encoded based on a predetermined first rule to generate a request signal as the transmission data.

At step S170, the microcomputer 23 sends the request signal generated at step S160 to the code collator 5 via the communication circuit 27 and the communication line 25.

Here, as described later, the code collator 5 receives the request signal and decodes the request signal to extract the random number generated at step S150. When only the start-up of the engine is detected due to the regular operation, the code collator 5 encodes data combined by the decoded random number and the password code ② stored in the memory 5a based on a predetermined second rule to generate a response signal, and then sends the response signal to the engine ECU 7.

At step S180, the microcomputer 23 detects whether the microcomputer 23 has received the response signal from the code collator 5 within the predetermined time after the microcomputer 23 sent the request signal at step S170.

When the microcomputer 23 receives the response signal from the code collator 5 within the predetermined time (at step S180; YES), the following step S190 is executed.

At step S190, the microcomputer 23 decodes the response signal by using a decoding method based on the second rule to extract the random number and the password code② being included in the response signal.

At step S200, the microcomputer 23 detects whether the received random number (that is, the random number extracted by the code collator at step S190) accords with the sent random number (that is, the random number generated at step S150) or not. When both random numbers are accord each other (at step S200; YES), the microcomputer 23 detects that the response signal corresponding to the request signal sent at step S170 is sent from the code collator 5, and then moves on to the step S210.

At step S210, the microcomputer 23 detects whether the password code ②from the code collator 5 obtained at step S190 accords with the password code stored in own EEPROM 45.

When the microcomputer 23 detects that both the password codes accord with each other at step S210 (at step S210; YES), the microcomputer 23 recognizes that the start-up of the engine is due to the regular operation, and moves on to step S220.

At step 220, the microcomputer 23 sets operation permission flag that permits the fuel injection and the ignition against the engine.

On the contrary, when the microcomputer 23 detects that it did not receive the response signal from the code collator 5 within the predetermined time at step S180 (at step S180; NO), when the microcomputer 23 detects that both random numbers do not accord with each other at step S200 (at step S200; NO), or when the microcomputer 23 detects that both password codes do not accord with each other at step S210 (at step S210; NO), the microcomputer detects that the start-up of the engine is not due to the regular operation, and moves on to step S230.

At step 230, the microcomputer 23 prohibits the fuel injection and the ignition against the engine by resetting the operation permission flag.

After one of step S220, S230 is executed, the microcomputer 23 moves on to step S240. At step S240, the microcomputer 23 executes a normal control process in which the engine is controlled by normal controlling. After executing step S240, the microcomputer returns to step S140.

On the contrary, when the microcomputer 23 detects that the detection process S145 has completed (at step S140; NO), that is, the detection process has already executed after the ignition switch is turned on, the microcomputer 23 moves on to step S240 to execute the normal control process, after that it returns to step S140.

Here, at the normal control process S240, the microcomputer 23 basically calculates a fuel injection amount and a ignition timing based on the pulse signal from the rotation sensor 29 or the LSB-adjusted A/D converted data stored in the engine controlling data loading region of the RAM 43, and actuates the fuel injector 17 and the igniter 19 based on the calculated results.

However, when the operation permission flag is reset as a result of at step S230, the microcomputer does not actuate the fuel injector 17 and the igniter 19, but stops the operation of the engine.

Here, the microcomputer 23 also detects the ON/OFF of the ignition switch 11 at this normal control process. When the microcomputer 23 detects that the ignition switch is being turned on, the microcomputer 23 maintains outputting the operation signal to the main relay 21. When the microcomputer 23 detects that the ignition switch is being turned off, and a power off condition, in which all processes concerning the engine control are completed, is affirmed, the microcomputer 23 stops outputting the operation signal to the main relay 21. As a result, the main relay 21 is turned off, the power from the battery to the engine ECU 7 is cut off, and then the engine ECU 7 stops its operation.

Furthermore, the microcomputer 23 repeatedly executes an every-4-ms process shown in FIG. 4 parallel with the normal control process in step S240 at every 4 ms. As shown in FIG. 4, the every-4-ms process includes steps S310–S330 which are the same as steps S110–S130 shown in FIG. 2A.

These steps are executed to periodically update the A/D converted data stored in the A/D converted data loading region of the RAM 43 and the engine controlling data loading region. Therefore, the LSB-adjusted A/D converted data used for engine control at step S240 shown in FIG.2 is always updated to newest.

When the microcomputer 23 makes affirmative detection at step S140 (at step S140; YES) as a result of detection, in which the ignition switch 11 is turned on again by the time the main relay 21 turns off after the ignition switch 11 is turned off, the microcomputer 23 generates the random number at step S150 by using the newest A/D converted data.

That is, in this embodiment, since the power off condition is not affirmed for some minutes (for example, 2 minutes) after the ignition switch 11 is turned off, the power from the battery 13 is kept to be supplied to the engine ECU 7 by the main relay 21. In the case when the microcomputer 23 detects that the ignition switch 11 is turned on again during the some minutes, it makes affirmative detection at step S140 shown in FIG. 2A (at step S140; YES), and then executes the detection process shown in FIG. 2B. However, in such a case, at step S150, the microcomputer 23 generates the random number based on the newest A/D converted data at steps 310, 320, but not based on the A/D converted data at steps 110, 120.

Figure 5A:
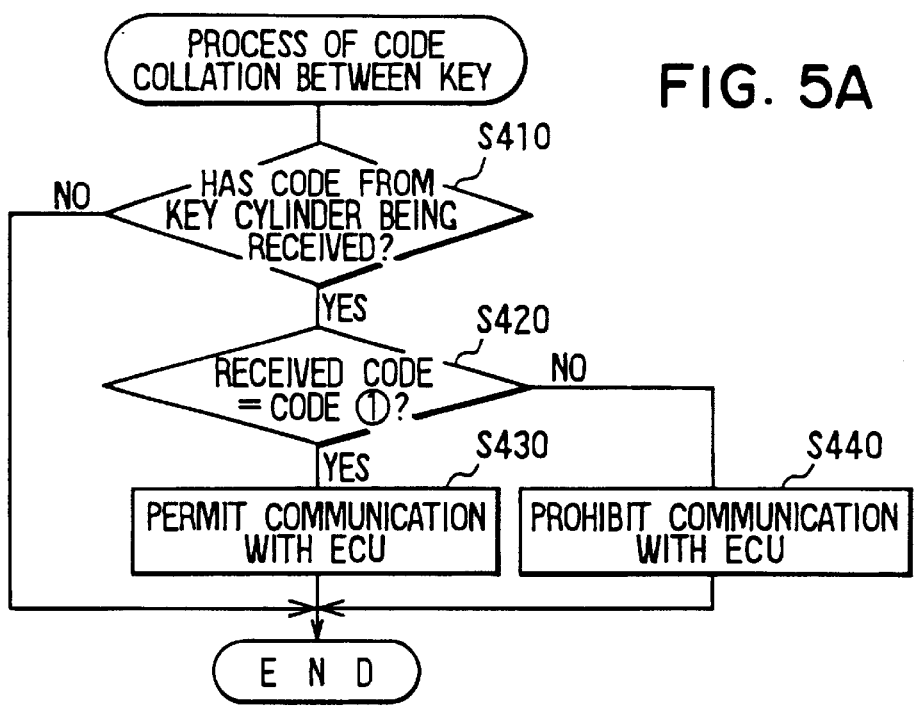
FIG. 5A is a flow chart of a process of code collation between an ignition key executed by a microcomputer of a code collator.
Figure 5B:
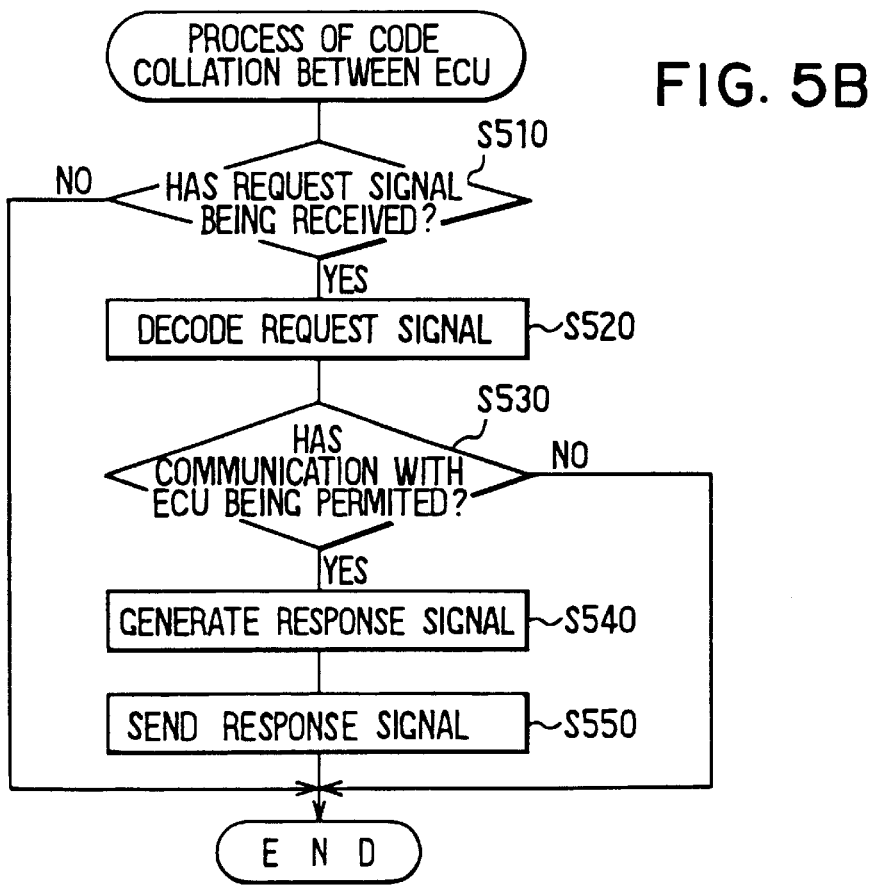
FIG. 5B is a flow chart of a process of code collation between the engine ECU executed by the microcomputer of the code collator.

The microcomputer 5b of the code collator 5 periodically executes a "process of code collation between an ignition key" shown in FIG. 5A, and a "process of code collation between engine ECU" shown in FIG. 5B.

As shown in FIG. 5A, after starting the "process of code collation between an ignition key", the microcomputer 5b detects whether it received the password code from the ignition key cylinder 3 (that is, the password of the ignition key inserted into the ignition key cylinder 3) at step S410.

When the microcomputer 5b detects that it has not received the password code (at step S410; NO), it once-stops the "process of code collation between an ignition key". When the microcomputer 5b detects that it received the password code (at step S410; YES), it moves on to step S420.

At step S420, the microcomputer 5b detects whether the password code in the ignition key received at step S410 accords with the password code ①in the memory 5a. When both password codes accord with each other (at step S420, YES), the microcomputer 5b recognizes that the ignition key inserted into the ignition key cylinder 3 is the regular key 1 and the start-up of the engine is due to the regular operation, and moves on to step S430.

At step S430, the microcomputer 5b permits to communicate with the engine ECU 7 and once-stops the "process of code collation between an ignition key".

On the contrary, when the microcomputer 5b detects that both password codes do not accord with each other (at step S420, NO), the microcomputer recognizes that the ignition key inserted into the ignition key cylinder 3 is not the regular key 1 and the start-up of the engine is not due to the regular operation, and moves on to step S440.

At step S440, the microcomputer 5b prohibits to communicate with the engine ECU 7 and once-stops the "process of code collation between an ignition key".

Next, as shown in FIG. 5B, after starting the "process of code collation between an engine ECU", at step S510, the microcomputer 5b detects whether it received the request signal sent from the engine ECU 7 at step S170. When the microcomputer 5b detects that it has not received the request signal (at step S510; NO), it once-stops the "process of code collation between an engine ECU".

When the microcomputer 5b detects that it received the request signal from the engine ECU 7 (at step S510; YES), it moves on to step S520.

At step S520, the microcomputer 5b decodes the received request signal from the engine ECU 7, and extracts the decoded request signal by using the decoding method based on the first rule to extract the random number included therein.

At step S530, the microcomputer detects whether the communication with the engine ECU 7 is permitted or not as the results of step S430.

When the communication with the engine ECU 7 is permitted (at step S530; YES), the microcomputer 5b moves on to step S540.

At step S540, the microcomputer 5b encodes data combined by the random number from the engine ECU decoded at step S540 and the password code ② stored in the memory 5a based on the predetermined second rule to generate a response signal.

At step S550, the microcomputer 5b sends the response signal to the engine ECU 7, and then it once-stops the "process of code collation between an engine ECU".

On the contrary, when the communication with the engine ECU 7 is not permitted (at step S530; NO), the microcomputer 5b once-stops the "process of code collation between an engine ECU" without sending the response signal to the engine ECU 7.

Here, in this embodiment, the A/D converter 49 and steps S110, S310 are included in an A/D converting means; step S240 is included in an control means; steps S170–S230 are included in an detecting means; steps S150, S160 are included in an data changing means; the code collator 5 is included in a regular operation detecting portion or the other device; and the engine ECU 7 is included in an engine controlling portion.

According to this vehicular anti-theft device, in the case when the code collator 5 detects that the password in the ignition key inserted into the ignition key cylinder 3 accords with the password code in the memory 5a (at step S420; YES), and the engine ECU 7 does not receive the response signal processed at steps S520, S540 by the code collator 5 in response to the request signal within the predetermined time after the engine ECU 7 sent the request signal to the collator 5 (at step S180; NO: at step S200; NO: at step S210; NO), the fuel injection and the ignition against the engine are prohibited to stop the operation of the engine (S230). In detail, the engine ECU 7 does not actuate the engine when the response signal having the random number included in the request signal sent by itself and the password code in own EEPROM 45 is returned by the code collator 5.

Here, in this embodiment, the code collator 5 generates the response signal to the engine ECU 7 to include the password code ② in the memory 5a of the code collator 5, and the engine ECU 7 prohibits the fuel injection and the ignition against the engine when the password code ② included in the response signal accords with the password code in own EEPROM 45 (at step S210; NO). Therefore, the operation of the engine can be negated even if a person who intends to steal the vehicle replaces the code collator 5 with code collator of the other vehicle.

Furthermore, if the code collator 5 is fixed in the vehicle so that it can not be replaced and if it does not need to consider a replacement of the code collator 5, the code collator 5 may generate the response signal based on only the random number from the engine ECU 7 at step S540 shown in FIG. 5B, and engine ECU 7 may omit step S210 shown in FIG. 2.

Furthermore, since the engine ECU 7 generates the request signal to the code collator 5 by generating the random number (S150) and encoding the generated random number (S160), the communication data to be communicated between the engine ECU 7 and the code collator 5, that is, the request signal to be sent from the engine ECU 7 to the code collator 5 and the response signal to be returned from the code collator 5 to the engine ECU 7, are changed at every communication.

Therefore, even if a person who intends to steal the vehicle investigates the communication data on the communication line 25 between the engine ECU 7 and the code collator 7 by using this vehicle or the other vehicles, and inputs such communication data to the engine ECU 7 via the communication line 25, it can prevent the engine ECU from starting up the engine. Hence, it can prevent the vehicle from being stolen without fail.

In this embodiment, since the code collator 5 permits the communication with the engine ECU 7 only when the code collator 5 detects that the password code in the ignition key inserted into the ignition key cylinder 3 accords with the password code, ① in the memory 5a (at step S420; YES, S430), the engine ECU can detect whether it should start up the engine or not by communicating with the code collator only one time.

Furthermore, since the engine ECU 7 generates the random number by using the A/D converted digital data converted by the A/D converter 49 (S150) and generates the request signal by encoding the random number (S160), the request signal to the code collator 5 is changed based on the A/D converted data from the A/D converter 49 at every sending.

Therefore, according to the vehicular anti-theft device of this embodiment, the communication data between the engine ECU 7 and the code collator 5 can be changed, and it can prevent the engine from starting up by the unjust conduct by a person who intends to steal the vehicle, without adding substantial components needless for the engine control in the engine ECU 7. Hence, a security performance against a theft of the vehicle can largely improve without adding substantial components.

In addition, since the engine ECU 7 generates the random number by serially combining lower 2-bits of each eight A/D converted data converted by the A/D converter 49 and generates the request signal to the code collator 5 by using the random number, the request signal can be changed based on the digital data generated by combining lower 2-bits of each eight A/D converted data. Therefore, the request signal can be more random.

That is, since the A/D converted data converted by the A/D converter 49 includes the more A/D conversion error as the lower bit of the A/D converted data, the digital data on the basis of the request signal changes even if the signal level of the analog signal to be A/D converted is the same. Therefore, the request signal can be changed at random that can not be predicted even by the engineers. Hence, a security performance against a theft of the vehicle can largely improve.

Furthermore, since the request signal can be changed based on a plural kinds of A/D converted data, the request signal can be changed at random based on the A/D converted data of the other analog signal, even if one of analog signals to be A/D converted is investigated and is manipulated to a constant value.

Furthermore, the analog signals to be used for the request signal generation employs: the analog signals, in which it is hard to be manipulated externally, such as outputs from the temperature sensor 35 and the air pressure sensor 61, and power voltage $V_D$; and the analog signals, in which the vehicle does not normally operate if it is manipulated, such as battery voltage $V_B$. Therefore, it can prevent the vehicle from stealing without fail.

The present invention has explained with reference to one preferred embodiment, however, it may be modified as follows.

The combination order of the lower 2-bits of the A/D converted data may be changed at every time when the random number is generated at step S150 shown in FIG.2A. In this case, the request signal can be changed more random.

In this embodiment, the random number to be used for the request signal generation is generated by using the lower 2-bits of the A/D converted data, however, the random number may be generated by using the other bits or using more than 2-bits.

In this embodiment, the request signal is generated by encoding the random number generated by using the A/D converted data, however, the random number may be sent directly as the request signal without any process. Furthermore, a reference table indicating a relation between the random number and the request signal may be provided so that the request signal corresponding to the generated random number can be sent. These constructions can also change the request signal to be sent from the engine ECU 7 based on the A/D converted data.

Furthermore, the main construction of the above-described engine ECU 7 can be adopted to the other type vehicular anti-theft device.

For example, the engine ECU 7 may previously send the transmission data generated by the same procedure as the above request signal to the code collator 5, and stops the operation of the engine when the engine ECU 7 does not receive the response data corresponding to the sent transmission data from the code collator after detecting the ignition switch 11 being turned on.

What is claimed is:

1. An engine control system for controlling an engine of a vehicle comprising:
   A/D converting means for converting an analog signal to be used for controlling an engine mounted on a vehicle to digital data;
   controlling means for controlling the engine by using the digital data;
   detecting means for sending transmission data to an external device, and stopping operating the engine via the controlling means when the detecting means detects that a start-up of the engine is not due to use of a valid ignition key based on a response from the external device; and
   data changing means for changing the transmission data based on the digital data converted by the A/D converting means at every time the detecting means sends the transmission data to the external device.

2. An engine control system according to claim 1, wherein:
   the A/D converting means converts a plurality of different analog signals to a plurality of digital data, respectively; and
   the data changing means combines the plurality of digital data based on a predetermined rule to generate a combined digital data, and changes the transmission data based on the combined digital data.

3. An engine control system according to claim 2, wherein the data changing means combines predetermined bits from a lowermost bit of each digital data to generate the combined digital data, and changes the transmission data based on the combined digital data.

4. An engine control system according to claim 1, wherein the data changing means changes contents of the transmission data.

5. An engine control system according to claim 1, wherein the analog signal is representative of an environment temperature signal for the vehicle.

6. An engine control system according to claim 5, wherein the environment temperature signal includes a signal proportional to temperature of the controlling means or a signal proportional to a temperature of a coolant of the engine.

7. An engine control system according to claim 1, wherein the analog signal is representative of a voltage signal for an engine control system.

8. An engine control system according to claim 7, wherein the voltage signal includes a battery voltage for the vehicle or voltage applied to the controlling means.

9. An engine control system according to claim 1, wherein the analog signal is representative of a running condition of the vehicle.

10. An engine control system according to claim 9, wherein the running condition includes at least one of intake pipe pressure and air pressure.

11. An engine control system according to claim 1, wherein the analog signal is representative by a signal of an intention of a vehicle user.

12. An engine control system according to claim 11, wherein the intention is represented by a signal of a brake sensor or a signal of accelerator sensor.

13. An engine control system according to claim 1, wherein:
   the response from the external device includes information about whether the detecting means receives response data from the external device, or whether the response data corresponds to the transmission data.

14. A vehicular anti-theft system for prevent a vehicle from being stolen comprising:
   a detecting portion that detects whether a start-up of an engine is due to a use of a valid ignition key or not, processes a predetermined process to data to be received via a communication line when the start-up of the engine is detected as using a valid ignition key, and sends the processed data to the communication line as response data; and
   an engine control portion connected to the detecting portion via the communication line to communicate with each other, comprising:
      A/D converting means for converting an analog signal to be used for controlling an engine mounted on a vehicle to digital data which is sent by a portion other than the engine control portion;
      controlling means for controlling the engine by using the digital data;
      detecting means for sending transmission data to the detecting portion, and stopping operating the engine via the controlling means when the detecting means detects that a start-up of the engine is not due to use of a valid ignition key based on a response from the detecting portion; and
      data changing means for changing the transmission data based on the digital converted data by the A/D converting means at every time the detecting means sends the transmission data to the detecting portion.

15. A vehicular anti-theft system according to claim 14, wherein:
   the A/D converting means converts a plurality of different analog signals to a plurality of digital data, respectively; and
   the data changing means combines the plurality of digital data based on a predetermined rule to generate a combined digital data, and changes the transmission data based on the combined digital data.

16. A vehicular anti-theft system according to claim 15, wherein the data changing means combines predetermined bits from a lowermost bit of each digital data to generate the combined digital data, and changes the transmission data based on the combined digital data.

17. A vehicular anti-theft system according to claim 14, wherein the analog data is sent by a sensing device provided on the outside of the engine control portion.

18. A vehicular anti-theft system according to claim 14, wherein the data changing means changes contents of the transmission data.

19. A vehicular anti-theft system according to claim 14, wherein the analog signal is representative of an environment temperature signal for the vehicle.

20. A vehicle anti-theft system according to claim 19, wherein the environment temperature signal includes a signal proportional to temperature of the controlling means or a signal proportional to a temperature of a coolant of the engine.

21. A vehicular anti-theft system according to claim 14, wherein the analog signal is representative of a voltage signal for an engine control system.

22. A vehicular anti-theft system according to claim 21, wherein the voltage signal includes a battery voltage for the vehicle or voltage applied to the controlling means.

23. A vehicular anti-theft system according to claim 14, wherein the analog signal is representative of a running condition of the vehicle.

24. A vehicular anti-theft system according to claim 23, wherein the running condition includes at least one of intake pipe pressure and air pressure.

25. A vehicular anti-theft system according to claim 14, wherein the analog signal is representative by a signal of an intention of a vehicle user.

26. A vehicular anti-theft system according to claim 25, wherein the intention is represented by a signal of a brake sensor or a signal of accelerator sensor.

27. A vehicular anti-theft system according to claim 14, wherein:
the response from the detecting portion includes information about whether the detecting means receives response data from the external device, or whether the response data corresponds to the transmission data.

28. An engine control device for controlling an engine of a vehicle comprising:
an A/D converter that converts an analog signal to be used for controlling an engine mounted on a vehicle to digital data;
a controller that controls the engine by using the digital data;
a detector that sends transmission data to an external device, and stops operating the engine via the controller when the detector detects that a start-up of the engine is not due to use of a valid ignition key if the detector does not receive response data corresponding to the transmission data from the external device; and
a data changer that changes the transmission data sent by the detector based on the digital data converted by the A/D converter at every time the detector sends the transmission data to the external device.

29. An engine control device according to claim 28, wherein:
the A/D converter converts a plurality of different analog signals to a plurality of digital data, respectively; and
the data changer combines the plurality of digital data based on a predetermined rule to generate a combined digital data, and changes the transmission data based on the combined digital data.

30. An engine control device according to claim 29, wherein the data changer combines predetermined bits from a lowermost bit of each digital data to generate the combined digital data, and changes the transmission data based on the combined digital data.

31. An engine control device according to claim 28, wherein:
the detector detects that the start-up of the engine is not due to the use of a valid ignition key from the external device within a predetermined time.

32. An engine control device according to claim 28, wherein the detector previously sends the transmission data to the external device, and detects that a start-up of the engine is not due to the use of a valid ignition key if the detector does not receive the response data before receiving a detection completion signal.

33. An engine control device according to claim 28, wherein the data changer changes the transmission data by encoding the digital data converted by the A/D converter.

34. An engine control device according to claim 28, wherein the data changer changes the transmission data by using the digital data as itself.

35. An engine control device according to claim 28, wherein the data changer has a reference table indicating a relation between the random number and the request signal, and changes the transmission data by referring the reference table.

36. An engine control device according to claim 28, wherein the analog signal to be used for controlling the engine is selected from at least one of a temperature in the engine control device, a power voltage to be applied to the engine control device, a coolant temperature, an intake pipe pressure, a depressing amount of a brake pedal, a depressing amount of an accelerator pedal and an air pressure.

37. An engine control device according to claim 28, wherein the data changer changes contents of the transmission data.

38. An engine control device according to claim 28, wherein the analog signal is representative of an environment temperature signal for the vehicle.

39. An engine control device according to claim 38, wherein the environment temperature signal includes a signal proportional to temperature of the controlling means or a signal proportional to a temperature of a coolant of the engine.

40. An engine control device according to claim 28, wherein the analog signal is representative of a voltage signal for an engine control system.

41. An engine control device according to claim 40, wherein the voltage signal includes a battery voltage for the vehicle or voltage applied to a controller.

42. An engine control device according to claim 28, wherein the analog signal is representative of a running condition of the vehicle.

43. An engine control device according to claim 42, wherein the running condition includes at least one of intake pipe pressure and air pressure.

44. An engine control device according to claim 28, wherein the analog signal is representative by a signal of an intention of a vehicle user.

45. An engine control device according to claim 44, wherein the intention is represented by a signal of a brake sensor or a signal of accelerator sensor.

46. An engine control device according to claim 28, wherein:
the response from the external device includes information about whether the detector receives response data from the external device, or whether the response data corresponds to the transmission data.

47. An engine control device for controlling an engine of a vehicle comprising:

a controller that outputs control signals for controlling the engine mounted on a vehicle based on digital data generated by analog-to-digital-converting an analog signal to be used for controlling the engine;

a detector that sends transmission data to an external device, and stops operation of the engine when the detector detects that a start-up of the engine is not due to use of a valid ignition key based on a response from the external device; and a data changer that changes the transmission data based on the digital data.

48. An engine control device according to claim 47, wherein the data changer changes contents of the transmission data.

49. An engine control device according to claim 47, wherein the analog signal is representative of an environment temperature signal for the vehicle.

50. An engine control device according to claim 49, wherein the environment temperature signal includes a signal proportional to temperature of the controller or a signal proportional to a temperature of a coolant of the engine.

51. An engine control device according to claim 47, wherein the analog signal is representative of a voltage signal for an engine control system.

52. An engine control device according to claim 51, wherein the voltage signal includes a battery voltage for the vehicle or voltage applied to a controller.

53. An engine control device according to claim 47, wherein the analog signal is representative of a running condition of the vehicle.

54. An engine control device according to claim 53, wherein the running condition includes at least one of intake pipe pressure and air pressure.

55. An engine control device according to claim 47, wherein the analog signal is representative by a signal of an intention of a vehicle user.

56. An engine control device according to claim 55, wherein the intention is represented by a signal of a brake sensor or a signal of accelerator sensor.

57. An engine control device according to claim 47, wherein:

the response from the external device includes information about whether the detector receives response data from the external device, or whether the response data corresponds to the transmission data.

58. An engine control device for controlling an engine of a vehicle comprising:

an A/D converter that converts an analog signal to be used for controlling an engine mounted on a vehicle to digital data;

a detector that sends transmission data to an external device, and stops operation of the engine when the detector detects that a start-up of the engine is not due to use of a valid ignition key based on a response from the external device; and a data changer that changes the transmission data based on the digital data converted by the A/D converter at every time the detector sends the transmission data to the external device.

59. An engine control device according to claim 58, wherein the data changer changes contents of the transmission data.

60. An engine control device according to claim 58, wherein the analog signal is representative of an environment temperature signal for the vehicle.

61. An engine control device according to claim 60, wherein the environment temperature signal includes a signal proportional to temperature of a controller or a signal proportional to a temperature of a coolant of the engine.

62. An engine control device according to claim 58, wherein the analog signal is representative of a voltage signal for an engine control system.

63. An engine control device according to claim 62, wherein the voltage signal includes a battery voltage for the vehicle or voltage applied to a controller.

64. An engine control device according to claim 58, wherein the analog signal is representative of a running condition of the vehicle.

65. An engine control device according to claim 64, wherein the running condition includes at least one of intake pipe pressure and air pressure.

66. An engine control device according to claim 58, wherein the analog signal is representative by a signal of an intention of a vehicle user.

67. An engine control device according to claim 66, wherein the intention is represented by a signal of a brake sensor or a signal of accelerator sensor.

68. An engine control device according to claim 58, wherein:

the response from the external device includes information about whether the detector receives response data from the external device, or whether the response data corresponds to the transmission data.

69. A vehicular anti-theft device for prevent a vehicle from being stolen comprising:

a detecting portion that detects whether a start-up of an engine is due to use of a valid ignition key or not, processes a predetermined process to data to be received via a communication line when the start-up of the engine is detected as using a valid ignition key, and sends the processed data to the communication line as response data; and an engine control portion connected to the detecting portion via the communication line to communicate with each other, comprising:

an A/D converter that converts an analog signal to be used for controlling an engine mounted on a vehicle to digital data which is sent by a portion other than the engine control portion;

a controller that controls the engine by using the digital data;

a detector that sends a transmission data to the detecting portion, and stops operating the engine via the controller when the detector detects that a start-up of the engine is not due to use of a valid ignition key based upon a response from the detecting portion; and a data changer that changes the transmission data based on the digital converted data by the A/D converter at every time the detector sends the transmission data to the detecting portion.

70. A vehicular anti-theft device according to claim 69, wherein:

the A/D converter converts a plurality of different analog signals to a plurality of digital data, respectively; and the data changer combines the plurality of digital data based on a predetermined rule to generate a combined digital data, and changes the transmission data based on the combined digital data.

71. A vehicular anti-theft device according to claim 69, wherein the data changer combines predetermined bits from a lowermost bit of each digital data to generate the combined digital data, and changes the transmission data based on the combined digital data.

72. A vehicular anti-theft device according to claim 69, wherein the analog data is sent by a sensing device provided on the outside of the engine control portion.

73. A vehicular anti-theft device according to claim 69, wherein the data changer changes contents of the transmission data.

74. A vehicular anti-theft device according to claim 69, wherein the analog signal is representative of an environment temperature signal for the vehicle.

75. A vehicular anti-theft device according to claim 74, wherein the environment temperature signal includes a signal proportional to temperature of the controller or a signal proportional to a temperature of a coolant of the engine.

76. A vehicular anti-theft device according to claim 69, wherein the analog signal is representative of a voltage signal for an engine control system.

77. A vehicular anti-theft device according to claim 76, wherein the voltage signal includes a battery voltage for the vehicle or voltage applied to a controller.

78. A vehicular anti-theft device according to claim 69, wherein the analog signal is representative of a running condition of the vehicle.

79. A vehicular anti-theft device according to claim 78, wherein the running condition includes at least one of intake pipe pressure and air pressure.

80. A vehicular anti-theft device according to claim 69, wherein the analog signal is representative by a signal of an intention of a vehicle user.

81. A vehicular anti-theft device according to claim 80, wherein the intention is represented by a signal of a brake sensor or a signal of accelerator sensor.

82. A vehicular anti-theft system according to claim 69, wherein:

the response from the detecting portion includes information about whether the detector receives response data from the detecting portion, or whether the response data corresponds to the transmission data.

* * * * *